United States Patent Office 2,876,482
Patented Mar. 10, 1959

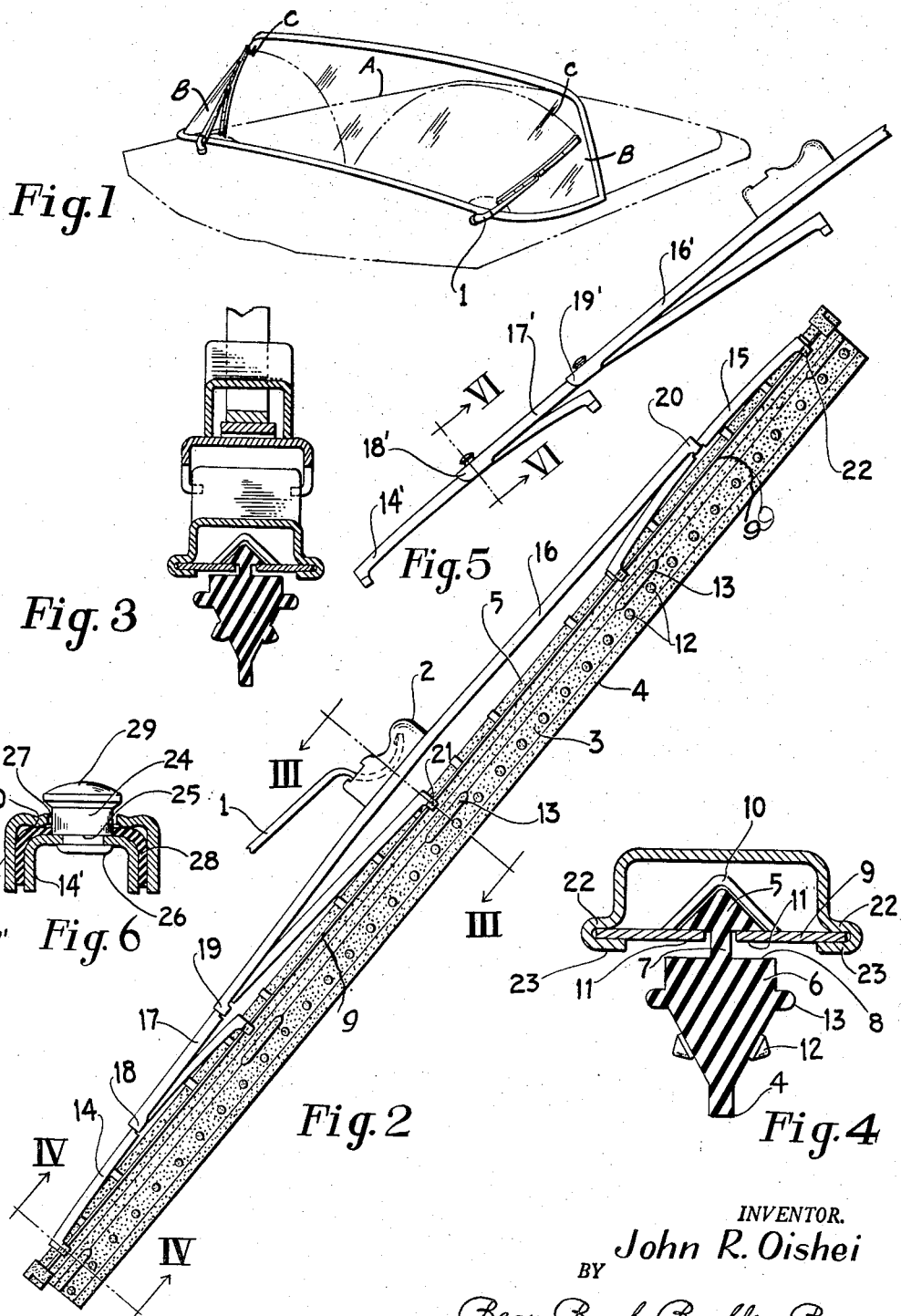

2,876,482

WINDSHIELD WIPER

John R. Oishei, Buffalo, N. Y., assignor to Trico Products Corporation, Buffalo, N. Y.

Application June 4, 1954, Serial No. 434,377

2 Claims. (Cl. 15—245)

This invention relates to a windshield wiper especially adapted for the wiping of curved surfaces.

The trend of the currently used windshields is to extend the glass around to the side of the vehicle by a deeper or sharper curve. This continuity of the field of vision from the front area around into the side area without obstruction by windshield frame members provides a panoramic field of vision for the motorist which enables him to better view the traffic conditions straight ahead as well as off side therefrom, giving a better picture for safe driving. In inclement weather it is obviously important to maintain this wide field of vision as clear as possible.

Heretofore, a wiper has been satisfactorily employed that utilized a primary yoke and two terminally mounted rockers or secondary yokes. However, with the shield now being extended to the side over a sharper curvature, the outer secondary yoke has been found to react unfavorably by reason of its inner end exerting a lifting force on the medial zone of the wiping blade, thereby causing its wiping edge to lift off the glass and leave the field of vision blurred. To overcome this serious impairment of the field, the present invention aims to provide a wiper that will hug close to the surface in passing over sharp bends and effectively clean the entire angular areas, lateral as well as frontal, of the field.

Again, it is an object of this invention to provide a surface conforming wiper by which the arm applied pressure is properly distributed to the blade and its flexible backing support in a manner to cause the outer end of the blade to closely follow the deeply curved contour of the shield and maintain wiping contact throughout its entire length.

A further object of the invention is to provide a curved surface wiper of this character in which the outer end of the blade is caused to hug the glass in wiping contact under an arm pressure applied by an outwardly disposed pressure equalizing yoke and, at the same time, the adjoining medial portion of the blade, between inner and outer pressure equalizing yokes, is independently and successfully held in wiping contact against the reactionary force at the inner end of such yoke, thereby insuring a clean sweep of the field of vision inclusive of the bend in the shield.

Again, the invention has for its aim to provide a wiper in which a system of levers is embodied in a foldable pressure distributing frame or superstructure in a manner to insure quietness of operation and a more effective surface-conforming application of the arm applied pressure by which the flexing conformance of the blade to the surface is more easily accomplished.

The foregoing and other objects will manifest themselves as this description progresses, reference being made therein to the accompanying drawing, wherein Fig. 1 is a fragmentary perspective view showing the application of the present invention to an automobile windshield;

Fig. 2 is a side elevation of the improved wiper mounted upon the outer end of an actuating arm;

Fig. 3 is a transverse sectional view about on line III—III of Fig. 2;

Fig. 4 is a similar view about on line IV—IV of Fig. 2;

Fig. 5 is a fragmentary side elevation of a modified wiper; and

Fig. 6 is a transverse sectional view about on line VI—VI of Fig. 5.

Referring more particularly to the drawing, the illustrated curved windshield is of the panoramic or wrap-around design which has a frontal area A joined to flanking lateral areas B by relatively more sharply curved crest areas C. The numeral 1 designates a wiper actuating arm that is mountable upon its rockshaft (not shown) and has its outer end spring pressed and connected by a mounting clip or coupling 2 to the improved wiper which has a flexible wiping blade 3 of rubber, or the like, with a wiping edge 4 along one longitudinal margin and an anchoring bead 5 along its opposite margin, the anchoring bead being joined to the body 6 of the blade by a reduced neck 7 thereby providing flex limiting shoulders 8 at opposite sides of the neck for alternate rocking contact with the underface of a flexible backing strip 9. In the illustrated embodiment, the backing strip has an inverted channel formation as defined by a longitudinal series of upwardly arched cross straps 10 in which the bead is loosely confined by the underlying and inwardly extending shoulders 11. The neck is freely received between the shoulders 11 to permit the body 6 to trail or drag behind in an inclined position as determined by the engagement of each shoulder 8 with the channel backing strip when the wiper is oscillated sidewise. Skid knobs 12 and roll-checking snubbers 13 may be formed on the opposite sides of the body above the wiping edge to protect the glass as well as the cleaner mechanism.

In accordance with the present invention the arm pressure is applied in part to this readily conformable blade unit 3, 9, through an outboard pressure-equalizing rocker to cause the outer wrap-around end portion thereof to follow closely the surface contour of the windshield and, concurrently to apply another increment of the arm pressure in an independent manner to hold the medial wiping portion in an operative contact with the surface area of lesser curvature against forces tending to lift the wiping edge with a resultant skipping of the blade.

To this end the pressure distributing superstructure employed comprises inner and outer terminal pressure-equalizing yoke bars or rockers 14 and 15, respectively, and a lever system as constituted by a primary lever 16 and a secondary lever 17, the latter having fulcrum support on the inner equalizer or rocker 14, as indicated at 18, while the primary lever has fulcrum support at 19 on the medial portion of the secondary lever 17. The primary lever reaches outwardly to the medial portion of the rocker 15, as indicated at 20. The opposite end of the secondary lever extends in an outward direction to a point medially of the blade unit where it is slidably connected to the medial portion of the backing strip, as at 21. The arm attaching clip 2 is fixed on the primary lever immediately over this sliding connection, or substantially so. The opposite ends of the equalizing yokes, as well as the outer end of the secondary lever 17, may be slidably connected to the opposite side margins of the backing strip each with a like connection as provided by the pressure applying feet 22 and their underlying claw extensions 23.

This arrangement forms a system of levers in which the primary lever 16, by reason of its long outward reach, applies a substantial portion of the arm pressure medially to the outwardly disposed equalizer 15 which, in turn, distributes equal increments of the arm pressure to the flexible backing. A pressure increment is also applied medially of the blade through the secondary lever 17 by which the medial portion of the blade unit is held down in wiping contact with the crest area against the tendency of the inner end of the outer yoke to kick up or lift when its outer end dips to follow a receding surface area B. The arm pressure is thereby differentially applied to the blade unit. Preferably, substantially like increments of arm pressure are applied by the medial bearing 21 between the two equalizers 14 and 15 and by the opposite ends of the outer yoke 15, and the pressure is carried to these three points through sole pivotal connections 19 and 20. On the other hand, the pressure applied by the opposite ends of the inner yoke 14 is transmitted thereto through plural pivotal connections 18 and 19. The faster moving outer portion of the blade will thereby be better controlled against lateral roll and the blade conformance will be more effectively accomplished. The slower moving inner end portion may wipe either under a lighter pressure or a similar pressure, and while the mounting clip may be turned around for use under certain conditions, thereby reversing the foldable pressure distributing frame to have the inner rocker 14 located at the outer end of the blade and the outer rocker 15 at the inner end, the preferred arrangement is that illustrated in the drawing. The several folding parts of the pressure distributing frame may be formed of channeled stock and the connections 18 and 19 effected by straddling ears turned under the lower element.

This arrangement provides a pressure distributing superstructure embodying three fulcrum points and having five longitudinally spaced pressure connections to the flexible backing strip, thereby dividing the latter into four resilient surface conforming portions of similar flexibility. The foldable pressure distributing frame utilizes two pressure equalizing yokes or rockers and an interposed hold-down lever connection to the flexible backing. The two levers and the two yokes constitute, in effect, an articulated four-element superstructure which, with the backing strip, provides two terminal zones of like dimension and a longer medial zone, the latter being subdivided by the medial bearing 21 to form the two medial portions. The inner one of the terminal zones may be coextensive with the inner yoke 14 which latter fulcrums on the inner end of the secondary lever and operates on the relatively flat or lesser curved frontal area of the windshield inwardly of the primary lever. Consequently, the inner yoke rocks but little when wiping the frontal area and therefore maintains a substantially normal position in its arcuate movement to provide a rather steady fulcrum point for the secondary lever to move about in transmitting the arm pressure to the medial bearing 21. In this manner the normal resilience of the backing of the blade is directed to hold the medial portion of the blade more dependably in contact with the glass. The arm pressure is distributed to the inner terminal zone of the blade over an area that is longer than the area constituting the outer terminal zone. In the articulate arrangement of the levers, the overall distribution of arm pressure to each of the three zones is so arranged that the augmented pressure to the medial zone is provided by the subdivision of the arm pressure at one end of the primary lever. This results in a division and subdivision of the whole of the arm pressure into substantially equal pressure increments to the four pressure portions of the backing strip wherein the bending moment to flex the resilient backing is blended to conform it into a compound curvature having radii of different magnitudes as found in the panoramic windshields. By reason of the four bar-like divisions of the backing strip through the pressure applying frame, the augmenting arm pressure is directed in measured proportion to the center, providing a broader articulating range of motion centrally than elsewhere in the movement perpendicular to the windshield surface and a greater freedom of motion inwardly of the medial zone than outwardly thereof. This greater range of motion in the lever contact centrally of the blade utilizes the leverage to obtain the desired result of having four blade areas of substantially equal bending flexibility over the entire length of the blade. The distribution of the total arm pressure may thus be divided to provide twenty percent or one-fifth of the total distributable arm pressure at each of the five points of connections to the blade unit. The advantage of the arrangement accrues in the ability to divide the arm pressure into increments for a better application of the available commercial arm pressure than can be applied in conjunction with the limits of torque of windshield wiper motors. The pressure distributing frame provides a flexible superstructure in which the primary and secondary levers constitute an elevated support through which the arm pressure is transmitted to the pressure equalizing yokes. The elevated support is rockably mounted at each end by its own pressure equalizing yoke, and between such longitudinally spaced and independently rockable yokes the elevated support provides medial support for the backing strip 9 to act through the latter in resisting the inner end of the outer yoke lifting the wiping edge out of wiping contact as said outer yoke moves about the more sharply curved crest area. Thus, the elevated support, rockably mounted at its opposite ends, applies a hold-down pressure to the blade unit between the independently rockably equalizing yokes by reason of its downward extension into the intervening space between the yokes.

In Figs. 5 and 6 a modified connection is depicted at 18' and 19' for interconnecting one yoke with the secondary and primary levers 17' and 16', such connections each comprising an upstanding pin 24 having a shoulder 25 seating upon the underlying frame element or member at each point of connection and a downwardly protruding end swaged over, as shown at 26. The shank of the pin or rivet 24 extends freely through an opening 27 in the overlying lever for the limited freedom of movement in different directions that may be requisite for efficient operation. For quietness in operation, there is interposed between the nested channel parts a rubber washer or sheet 28 to silence the contacts between the side and bottom walls of the metallic parts. In this modified construction, the arm pressure will be transmitted through a facial contact of one on the other of the nested parts 14', 16', 17', each pin or rivet having an enlarged head 29 spaced above the upper nested element or member to provide for free folding or collapsing movement of the frame parts. The upper one of the two nested parts in each instance may also be depressed or dimpled at opposite sides of the pin 24 to form knife-edge bearings 30 for rockingly supporting the under member for movement about a transverse axis. This arrangement provides a sturdy construction, sufficient clearance being provided between the pins and the margins of the openings 27 to afford a proper folding action of the pressure distributing frame when conforming to the changing contour of a windshield.

The wrap-around action at the outer end portion of the blade is accomplished in a controlled manner so that when the outer end of the outer yoke rocks downwardly to follow a receding surface any reacting tendency at the inner end of the yoke to lift will be successfully resisted by the medial bearing 21. Furthermore, the lateral roll of the outer blade portion will be held under better control by reason of a minimum number of pivotal connections through which the arm pressure is transmitted. The wiper is efficient for the cleaning of sharply contoured surfaces of which purpose its effective length is increased over that heretofore used for passenger cars, the greater length facilitating the wrap-around contact of the wiping edge with the glass.

The foregoing description has been given in detail for clarity and without thought of limitation since the inventive principles involved are capable of assuming other

What is claimed is:

1. A wiper for a curved windshield of the panoramic design having a frontal area joined to flanking lateral areas by relatively more sharply curved crest areas, said wiper comprising a flexible blade unit having a resilient backing strip, and a pressure distributing superstructure including a pair of longitudinally spaced pressure-equalizing yokes each connected at its opposite extremities to said backing strip and medially arched upwardly therefrom, a secondary lever pivotally connected at one end to one yoke between its extremities and having its opposite end connected to said backing strip between said yokes, and a primary lever pivotally connected at one end to the other yoke between its extremities and at its opposite end to said secondary lever between its ends, said primary and secondary levers constituting an elevated support rockably mounted at its opposite ends by the respective pressure equalizing yokes and having a pressure applying contact medially of the blade unit to act through the backing strip in resisting the outer yoke lifting from the windshield surface at the inner end of the outer yoke as the latter moves about the adjacent more sharply curved crest area.

2. A wiper for a curved windshield of the panoramic design having a frontal area joining to flanking lateral areas by relatively more sharply curved crest areas, said wiper comprising a flexible blade unit having a resilient backing strip, and a pressure distributing superstructure including a pair of longitudinally spaced pressure-equalizing yokes, and an elevated support pivotally mounted at its opposite ends by the yokes to provide clearance for overreaching the respective crest area when wiping the adjacent lateral area, said elevated support having a secondary lever and a primary lever, said secondary lever pivotally connected at one end to one yoke between its extremities and having its opposite end connected to said backing strip medially between said yokes, and said primary lever pivotally connected at one end to the other yoke between its extremities and above the blade unit and at its opposite end to said secondary lever between its ends, said secondary lever having a single point engagement with the blade unit below the pivotally mounted ends of the elevated support to act through the backing strip toward holding down the inner end of the outer yoke as the latter moves about the adjacent crest area.

References Cited in the file of this patent

UNITED STATES PATENTS

| | | |
|---|---|---|
| 2,537,411 | Klingler | Jan. 9, 1951 |
| 2,548,090 | Anderson | Apr. 10, 1951 |
| 2,563,356 | Nesson | Aug. 7, 1951 |
| 2,634,446 | Mackie et al. | Apr. 14, 1953 |
| 2,664,583 | Oishei | Jan. 5, 1954 |
| 2,672,641 | Scinta et al. | Mar. 23, 1954 |
| 2,702,397 | Oishei | Feb. 22, 1955 |

FOREIGN PATENTS

| | | |
|---|---|---|
| 1,051,298 | France | Sept. 16, 1953 |